(12) United States Patent
Kim et al.

(10) Patent No.: US 10,825,259 B2
(45) Date of Patent: Nov. 3, 2020

(54) THREE-DIMENSIONAL POINT DATA ALIGNMENT WITH PRE-ALIGNMENT

(71) Applicant: THE BOEING COMPANY, Chicago, IL (US)

(72) Inventors: Kyungnam Kim, Oak Park, CA (US); Heiko Hoffmann, Simi Valley, CA (US)

(73) Assignee: THE BOEING COMPANY, Chicago, IL (US)

( * ) Notice: Subject to any disclaimer, the term of this patent is extended or adjusted under 35 U.S.C. 154(b) by 61 days.

(21) Appl. No.: 16/238,002

(22) Filed: Jan. 2, 2019

(65) Prior Publication Data

US 2020/0211293 A1 Jul. 2, 2020

(51) Int. Cl.
*G06T 19/20* (2011.01)
*G06T 17/00* (2006.01)
(Continued)

(52) U.S. Cl.
CPC .............. *G06T 19/20* (2013.01); *B64G 1/244* (2019.05); *G01S 17/42* (2013.01); *G01S 17/89* (2013.01);
(Continued)

(58) Field of Classification Search
CPC ......... G06T 19/20; G06T 17/00; B64G 1/244; G01S 17/42
(Continued)

(56) References Cited

U.S. PATENT DOCUMENTS 5,512,743 A 4/1996 Shaffer et al.
2003/0218546 A1 11/2003 Lemp, III
(Continued)

FOREIGN PATENT DOCUMENTS

CN 102114919 A 7/2011
JP 2002220099 A 8/2002
(Continued)

OTHER PUBLICATIONS

S. Rusinkiewicz and M. Levoy, "Efficient Variants of the ICP Algorithm," 3-D Digital Imaging and Modeling, 2001, IEEE, pp. 145-152.
(Continued)

*Primary Examiner* — Hai Tao Sun
(74) *Attorney, Agent, or Firm* — Moore IP Law

(57) ABSTRACT

An apparatus to generate a model of a surface of an object includes a data set pre-aligner configured to receive multiple sets of surface data that correspond to respective portions of a surface of an object and that include three-dimensional (3D) points. The data set pre-aligner is also configured to perform a pre-alignment of overlapping sets to generate pre-aligned sets, including performing a rotation operation on a second set of the surface data, relative to a first set of the surface data that overlaps the second set, to apply a rotation amount that is selected from among multiple discrete rotation amounts and based on a similarity metric. The apparatus includes a data set aligner configured to perform an iterative alignment of the pre-aligned sets to generate aligned sets. The apparatus also includes a 3D model generator configured to combine the aligned sets to generate a 3D model of the object.

20 Claims, 7 Drawing Sheets

(51) Int. Cl.
*G01S 17/42* (2006.01)
*G01S 17/89* (2020.01)
*B64G 1/24* (2006.01)

(52) U.S. Cl.
CPC ...... *G06T 17/00* (2013.01); *G06T 2219/2004* (2013.01); *G06T 2219/2016* (2013.01)

(58) Field of Classification Search
USPC .......................................................... 345/420
See application file for complete search history.

(56) References Cited

U.S. PATENT DOCUMENTS

| | | | |
|---|---|---|---|
| 2007/0031064 A1* | 2/2007 | Zhao | G06T 7/33 382/285 |
| 2008/0023587 A1* | 1/2008 | Head | B64G 1/62 244/158.4 |
| 2012/0275686 A1* | 11/2012 | Wilson | G06K 9/00355 382/154 |
| 2014/0022248 A1* | 1/2014 | Kuffner, Jr. | G06T 19/20 345/420 |
| 2014/0028673 A1* | 1/2014 | Gregson | G06T 15/08 345/420 |
| 2014/0064554 A1 | 3/2014 | Coulter et al. | |
| 2016/0306071 A1 | 10/2016 | Iranpour et al. | |
| 2016/0306824 A1 | 10/2016 | Lopez et al. | |
| 2019/0120946 A1* | 4/2019 | Wheeler | G01S 17/42 |

FOREIGN PATENT DOCUMENTS

| | | |
|---|---|---|
| RU | 2608193 C1 | 1/2017 |
| WO | 2015136102 A1 | 9/2015 |

OTHER PUBLICATIONS

S.D. Brown, D.D. Blevins and J.R. Schott, "Time-Gated Topographic LIDAR Scene Simulation," Proceedings of the SPIE, vol. 5791, pp. 342-353, 2005.

N. Peinecke, T. Lueken and B.R. Korn, "LIDAR Simulation Using Graphics Hardware Acceleration," 27th IEEE/AIAA Digital Avionics Systems Conference, Oct. 26-30, 2008 IEEE, pp. 4.D.4-1-4.D. 4-8.

L.T. Ene, E. Naesset, T. Gobakken, T.G.Gregorie, G. Stahl and R. Nelson, "Assessing the Accuracy of Regional LIDAR-Based Biomass Estimation Using a Simulation Approach," Remote Sensing of Environment, Elsevier, vol. 123, pp. 579-592, 2012.

V. Mendez, H. Catalan, J.R. Rosen, J. Arno, R. Sanz, and A. Tarquis, "SIMLIDAR—Simulation of LIDAR Performance in Artificially Simulated Orchards," Biosystems Engineering, Elsevier, Jan. 2012, pp. 1-23.

Bechtold and B. Holfe, "HELIOS: A Multi-Purpose LIDAR Simulation Framework for Research Planning and Training of Laser Scanning Operations With Airborne, Ground-Based Mobile and Stationary Platforms," ISPRS Annals of Photogrammetry, Remote Sensing and Spatial Information Sciences, vol. III-3, 2016, XXIII ISPRS Congress, Jul. 12-19, 2016, Prague, Czech Republic, pp. 161-168.

Freidman, J. H.; Bentley, J. L.; Finkel, R. A. (1977). "An Algorithm for Finding Best Matches in Logarithmic Expected Time". ACM Transactions on Mathematical Software, vol. 3, No. 3, Sep. 1977, pp. 209-226.

Shaffer, William A., et al., "Asteroid Detection and Monitoring Using a Satellite-borne Visible Scanner," Naval Research Laboratory Report 5621-93-9538, Jan. 15, 1993, pp. 1-11.

* cited by examiner

THREE-DIMENSIONAL POINT DATA ALIGNMENT WITH PRE-ALIGNMENT

FIELD OF THE DISCLOSURE

The present disclosure is generally related to aligning three-dimensional (3D) point data representing portions of a surface of a scanned object.

BACKGROUND

Three-dimensional (3D) scans are typically performed on an object to enable generation of a 3D model of the object from the scan data. When an object to be scanned is larger than a field of capture of a 3D sensor system, such as a light detection and ranging (lidar) system, a scan of the object is performed by combining multiple scans of overlapping portions of the object. Combining a large number of scans to generate the 3D model can be computationally expensive, requiring a relatively large amount of processing resources and power consumption to achieve a determined level of accuracy within an acceptable time frame.

3D virtual reconstruction or modeling of natural space objects, such as comets and asteroids, is a challenging task to perform at a spacecraft. Most natural objects lack well defined, unique features, texture, or landmarks. For example, reconstructing a round shaped asteroid can be difficult. The lack of such features and the resulting difficulty of reconstruction of natural space objects creates challenges for other technical and engineering tasks such as control, navigation, mapping, and localization of the spacecraft relative to the natural space object, as well as space exploration. In addition to the increased difficulty, processing and power resources can be limited in space applications. Because space hardware is specifically designed to run in a space environment, processing capabilities of space hardware can be much reduced as compared to hardware for terrestrial applications.

SUMMARY

In a particular implementation, an apparatus to generate a model of a surface of an object includes a data set pre-aligner configured to receive multiple sets of surface data. Each of the multiple sets corresponds to a respective portion of a surface of an object and includes three-dimensional (3D) points of that portion of the surface of the object. The data set pre-aligner is also configured to perform a pre-alignment of overlapping sets of the multiple sets to generate pre-aligned sets. Performing the pre-alignment includes performing a rotation operation on a second set of the surface data, relative to a first set of the surface data that overlaps the second set, to apply a rotation amount that is selected from among multiple discrete rotation amounts, the rotation amount selected based on a similarity metric. The apparatus includes a data set aligner configured to perform an iterative alignment of the pre-aligned sets to generate aligned sets. The apparatus also includes a 3D model generator configured to combine the aligned sets to generate a 3D model of the object.

In another particular implementation, a method of generating a model of a surface of an object includes receiving multiple sets of surface data. Each of the multiple sets corresponds to a respective portion of a surface of an object and includes three-dimensional (3D) points of that portion of the surface of the object. The method includes performing a pre-alignment of overlapping sets of the multiple sets to generate pre-aligned sets. Performing the pre-alignment includes performing a rotation operation on a second set of the surface data, relative to a first set of the surface data that overlaps the second set, to apply a rotation amount that is selected from among multiple discrete rotation amounts, the rotation amount selected based on a similarity metric. The method also includes performing an iterative alignment of the pre-aligned sets to generate aligned sets and combining the aligned sets to generate a 3D model of the object.

In another particular implementation, a non-transitory, computer readable medium is disclosed that stores instructions that, when executed by a processor, cause the processor to initiate, perform, or control operations. The operations include receiving multiple sets of surface data. Each of the multiple sets corresponds to a respective portion of a surface of an object and includes three-dimensional (3D) points of that portion of the surface of the object. The operations include performing a pre-alignment of overlapping sets of the multiple sets to generate pre-aligned sets. Performing the pre-alignment includes performing a rotation operation on a second set of the surface data, relative to a first set of the surface data that overlaps the second set, to apply a rotation amount that is selected from among multiple discrete rotation amounts, the rotation amount selected based on a similarity metric. The operations also include performing an iterative alignment of the pre-aligned sets to generate aligned sets and combining the aligned sets to generate a 3D model of the object.

The features, functions, and advantages described herein can be achieved independently in various implementations or may be combined in yet other implementations, further details of which can be found with reference to the following description and drawings.

DETAILED DESCRIPTION

Aspects disclosed herein present systems and methods for 3D surface data alignment that enables efficient 3D virtual reconstruction of natural space objects, such as comets or asteroids, on constrained hardware. 3D virtual reconstruction can be used for localization, navigation, and space rendezvous operations. In a particular implementation, a fast registration method enables alignment of overlapping sets of surface data using pre-alignment, surface-normals, sub-sampling, and an iterative closest-point (ICP) operation. For example, techniques of the present disclosure enable fast full 3D virtual reconstruction on constrained hardware using a "breaking point" operation for the ICP operation, a "brute-force" operation for pre-alignment based on a "breaking point" parameter of a pairwise ICP operation, followed by performing the pairwise ICP operation with averaging for smooth 3D virtual reconstruction.

Techniques described herein provide new capabilities for future space missions such as landing on natural asteroids or comets, using novel full 3D virtual reconstruction processes running on constrained hardware at a spacecraft. Other applications include identification of an asteroid, such as to classify and clear man-made objects such as space debris. Accurate mapping of asteroids can be used to change an asteroid's path to avoid collision with Earth, such as by executing a rescue space operation at a desired location on the asteroid surface. Improvements are provided over existing 3D virtual reconstruction techniques and can be applied on a constrained space hardware while maintaining similar speed and accuracy as compared to conventional computing hardware.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
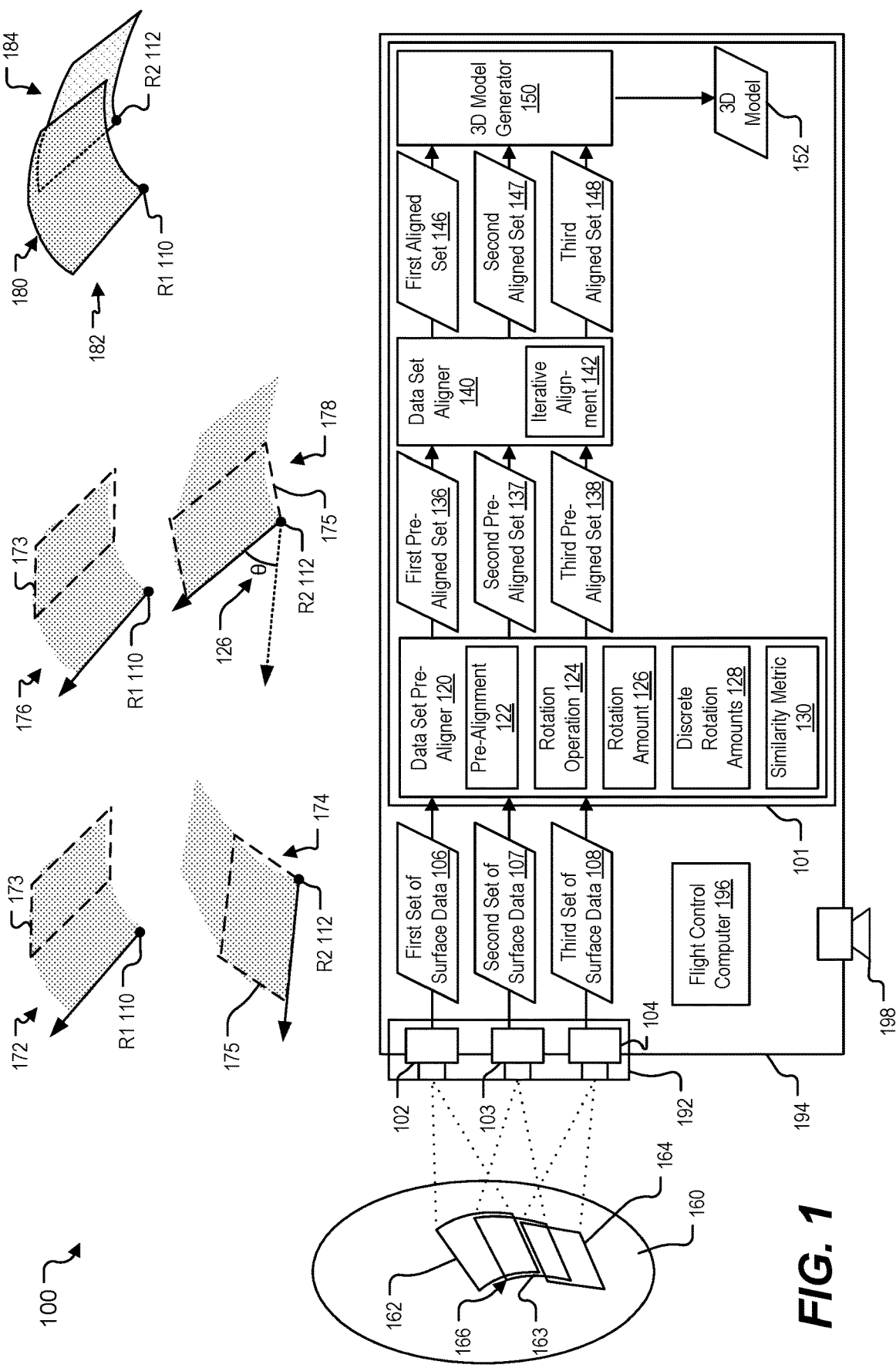
FIG. 1 is a diagram that illustrates a system configured to perform data alignment of 3D surface data of a scanned object.

Referring to FIG. 1, a system 100 is depicted that includes an apparatus 101 configured to perform a 3D scan of an object 160. For clarity of explanation, a first point cloud 172, a second point cloud 174, a first pre-aligned point cloud 176, a second pre-aligned point cloud 178, and a combined point cloud 180 depict illustrative examples of stages of an alignment process at the apparatus 101. The apparatus 101 is configured to capture information regarding the surface of the object 160 as a series of "patches" (also referred to as "tiles") and to piece together the patches to generate a 3D model 152. Because accuracy of the 3D model 152 is impacted if one or more of the patches is misaligned relative to other patches, alignment or "registration" of the patches is performed. The apparatus 101 is configured to automatically align the patches and generate the 3D model 152. Thus, an accurate 3D depiction of the surface of the object 160 can be obtained.

In FIG. 1, the apparatus 101 is implemented in a component of a spacecraft 194 that includes one or more 3D sensors, illustrated as a first 3D sensor 102, a second 3D sensor 103, and a third 3D sensor 104, configured to perform a 3D scan of the object 160 to generate a first set of surface data ("first surface data") 106, a second set of surface data ("second surface data") 107, and a third set of surface data ("third surface data") 108. The spacecraft 194 also includes a flight control computer 196 configured to control flight operations of the spacecraft 194, and one or more devices to alter a position, orientation, and trajectory of the spacecraft 194, illustrated as a representative thruster 198. The apparatus 101 also includes a data set pre-aligner 120, a data set aligner 140, and a 3D model generator 150. The first 3D sensor 102 is configured to generate the first surface data 106 representing a first portion 162 of the surface of the object 160. The second 3D sensor 103 is configured to generate the second surface data 107 representing a second portion 163 of the surface of the object 160. The third 3D sensor 104 is configured to generate the third surface data 108 representing a third portion 164 of the surface of the object 160.

The data set pre-aligner 120 is configured to perform a pre-alignment operation of pairs of overlapping sets of the sets of surface data 106-108 to generate pre-aligned sets 136-138, such as described in further detail below and with reference to FIG. 2. The data set aligner 140 is configured to perform an iterative alignment operation on pairs of overlapping sets of the pre-aligned sets 136-138 to generate aligned sets of surface data 146-148. The 3D model generator 150 is configured to combine the aligned sets of surface data 146-148 to generate the 3D model 152.

In a particular implementation, each of the 3D sensors 102-104 corresponds to a lidar sensor within a lidar system 192. In other implementations, each of the 3D sensors 102-104 corresponds to one or more of a stereo camera, a time-of-flight camera, a laser scanner, a structured light camera, one or more other 3D sensors, or combination thereof. In some implementations the first 3D sensor 102, the second 3D sensor 103, and the third 3D sensor 104 include the same type of sensor (e.g., lidar), and in other implementations the first 3D sensor 102, second 3D sensor 103, and the third 3D sensor 104 include different types of sensors (e.g., the first 3D sensor 102 and the second 3D sensor 103 include lidar and the third 3D sensor 104 includes a structured light camera).

The first 3D sensor 102 is aligned such that it captures the first surface data 106 corresponding to the first portion 162. The first surface data 106 includes 3D points (e.g., a list of points with three coordinates, such as (x, y, z)) that are graphically represented as the first point cloud 172, with each point in the first point cloud 172 having a position relative to a first reference (R1) 110 (e.g., a reference position and orientation graphically represented by an arrow). The second 3D sensor 103 is configured to capture the second surface data 107. For example, the second surface data 107 includes 3D surface data corresponding to the second portion 163, such as a collection of 3D points that are graphically represented as the second point cloud 174, with each point in the second point cloud 174 having a position relative to a second reference (R2) 112. The first surface data 106 and second surface data 107 each include a portion that corresponds to an overlap portion 166 of the first portion 162 and the second portion 163. The overlap portion 166 includes multiple 3D points that are used to perform an alignment with reference to the first surface data 106 and the second surface data 107, illustrated as an overlap portion 173 of the first point cloud 172 and an overlap portion 175 of the second point cloud 174. In the illustrative example, the first point cloud 172 and the second point cloud 174 can be aligned so that the orientation of R1 110 matches the orientation of R2 112 (e.g., the arrows are parallel to each other) and the positions of R1 110 and R2 112 are offset from each other based on an overlap amount, as illustrated in the combined point cloud 180.

The data set pre-aligner 120 is configured to receive multiple sets of surface data, illustrated as the multiple sets 106-108. Each of the multiple sets 106-108 corresponds to a respective portion 162-164 of the surface of the object 160 and includes 3D points of that portion of the surface of the object 160. Although only three sets of surface data 106-108 are illustrated for ease of explanation, any number of sets of surface data (e.g., thousands of sets) may be generated during a 3D scan of the object 160 and processed by the data set pre-aligner 120.

The data set pre-aligner 120 is configured to perform a pre-alignment 122 of overlapping sets of the multiple sets 106-108 to generate pre-aligned sets 136-138 including a first pre-aligned set 136, a second pre-aligned set 137, and a third pre-aligned set 138. In an illustrative example, the data set pre-aligner 120 is configured to perform a "coarse," "brute-force" alignment of the first point cloud 172 and the second point cloud 174 to generate the first pre-aligned point cloud 176 corresponding to the first pre-aligned set 136 and the second pre-aligned point cloud 178 corresponding to the second pre-aligned set 137.

Performing the pre-alignment 122 of the first set of surface data 106 and the second set of surface data 107 to generate the first pre-aligned set 136 and the second pre-aligned set 137 includes performing a rotation operation 124 on the second set of surface data 107, relative to the first set of surface data 106 that overlaps the second set 107, to apply a rotation amount 126 that is selected from among multiple discrete rotation amounts 128. The rotation amount 126 is selected based on a similarity metric 130. The third pre-aligned set 138 is generated by performing a second rotation operation on the third set of surface data 108 to apply a second rotation amount from among the multiple discrete rotation amounts 128. In some implementations, the second rotation operation rotates the third set of surface data 108 relative to the second pre-aligned set 137 to generate the third pre-aligned set 138. However, in other implementations the third pre-aligned set 138 is generated by rotating the third set of surface data 108 relative to the first pre-aligned set 136, relative to the first set of surface data 106, or relative to the second set of surface data 107. Additional details of performing the pre-alignment 122 are provided with reference to the particular implementation of the data set pre-aligner 120 described in FIG. 2.

As illustrated, no rotation has been applied to the first point cloud 172 to generate the first pre-aligned point cloud 176, and the second point cloud 174 has been rotated by the rotation amount (θ) 126 to generate the second pre-aligned point cloud 178. The directions of the references R1 110 and R2 112 are more closely aligned for the pre-aligned point clouds 176, 178 than for the point clouds 172, 174. However, the directions of the references R1 110 and R2 112 for the pre-aligned point clouds 176, 178 are not as closely aligned as for the combined cloud 180.

The data set aligner 140 is configured to perform an iterative alignment 142 of the pre-aligned sets 136-138 to generate the aligned sets 146-148 including a first aligned set 146, a second aligned set 147, and a third aligned set 148. In contrast to the "coarse" pre-alignment 122, the data set aligner 140 provides "fine" alignment. In a particular implementation, the iterative alignment 142 includes an ICP operation that aligns pairs of overlapping sets of points. Additional details of performing the iterative alignment 142 are provided with reference to the particular implementation described in FIG. 8. Although the iterative alignment 142 is described as including an ICP operation, in other implementations the iterative alignment 142 does not include an ICP operation.

As illustrated, no rotation has been applied to the first pre-aligned point cloud 176 to generate a first aligned point cloud 182. The second pre-aligned point cloud 178 has been rotated and translated to generate a second aligned point cloud 184. To illustrate, the second pre-aligned point cloud 178 is rotated so that the directions of the references R1 110 and R2 112 are more closely aligned for the aligned point clouds 182, 184 than for the pre-aligned point clouds 176, 178. The references R1 110 and R2 112 are positioned relative to each other in the aligned point clouds 182, 184 so that the overlap portion 173 substantially (or precisely) coincides with the overlap portion 175.

The 3D model generator 150 is configured to receive the aligned sets of surface data 146-148 and to combine the aligned sets 146-148 (e.g., aligned point clouds 182, 184 are combined by the 3D model generator 150 to generate the combined point cloud 180) to generate the 3D model 152 of the object 160. In some implementations, the 3D model 152 is used to enable operations (e.g., flight control operations) to be performed by the spacecraft 194 with respect to the object 160. For example, the 3D model 152 may be accessed by the flight control computer 196 and used to control movement of the spacecraft 194 relative to the surface of the object 160 via operation of the thruster 198.

Although operation of the apparatus 101 is described with reference to pre-aligning the second set of surface data 107 with respect to the first set of surface data 106, and aligning the second pre-aligned set 137 with respect to the first pre-aligned set 136, it should be understood that either or both sets of a pair of sets can be adjusted relative to the other set of the pair to perform pre-alignment, to perform alignment, or both. Although examples are provided with respect to alignment of the second set of surface data 107 relative to the first set of surface data 106, similar operations are performed to rotate the third set of surface data 108 with respect to the second pre-aligned set 137 to generate the third pre-aligned set 138, and to iteratively align the third pre-aligned set 138 with respect to the second aligned set 147 to generate the third aligned set 148.

The multiple-stage alignment performed by the apparatus 101 enables accurate alignment of the sets of surface data 106-108 using relatively limited processing resources. The pre-alignment 122 can generate a coarse alignment based on applying a discrete number of rotation amounts to a reduced set of data to select the rotation amount 126. The pre-alignment 122 provides a starting condition for the data set aligner 140 to generate a fine alignment using a reduced amount of processing resources and reduced possibility of non-convergence or convergence to a local minimum. As a result, the 3D model 152 can be generated with comparable accuracy and speed using space hardware of the spacecraft 194 as compared to performing conventional alignment techniques using conventional hardware.

Although FIG. 1 depicts the apparatus 101 as a component of the spacecraft 194, in other implementations the apparatus 101 is not implemented as a component of a spacecraft and instead is implemented as a component of an aircraft, an unmanned aerial vehicle (UAV), or another vehicle or as a component of a stationary system, such as a manufacturing system, as illustrative, non-limiting examples. Although only three portions of the surface of the object 160, e.g., first portion 162, second portion 163, and third portion 164, are illustrated, it should be understood that in some implementations the spacecraft 194 or the lidar system 192 is configured to scan all (or substantially all) of the surface of the object 160 using multiple overlapping patches to generate a full scan of the surface of the object 160. Although three 3D sensors (the first 3D sensor 102, the second 3D sensor 103, and the third 3D sensor 104) are illustrated, in other implementations the apparatus 101 may include a single 3D sensor, two 3D sensors, or more than three 3D sensors. As another example, the apparatus 101 may include a single 3D sensor that is moved relative to the surface of the object 160 during the scanning operation to scan the surface of the object 160, such as due to a relative motion of the spacecraft 194 relative to the object 160. In some implementations, the 3D sensors 102-104 are omitted and the data set pre-aligner 120 processes surface data that is received via another source, such as surface data received from a remote 3D scanner that is proximate to the object 160.

Although the data set pre-aligner 120, the data set aligner 140, and the 3D model generator 150 are depicted as separate components, in other implementations the described functionality of two or more of the data set pre-aligner 120, the data set aligner 140, and the 3D model generator 150 can be performed by a single component. In some implementations, each of the data set pre-aligner 120, the data set aligner 140, and the 3D model generator 150 can be represented in hardware, such as via an application-specific integrated circuit (ASIC) or a field-programmable gate array (FPGA), or the operations described with reference to the elements may be performed by a processor executing computer-readable instructions.

Figure 2:
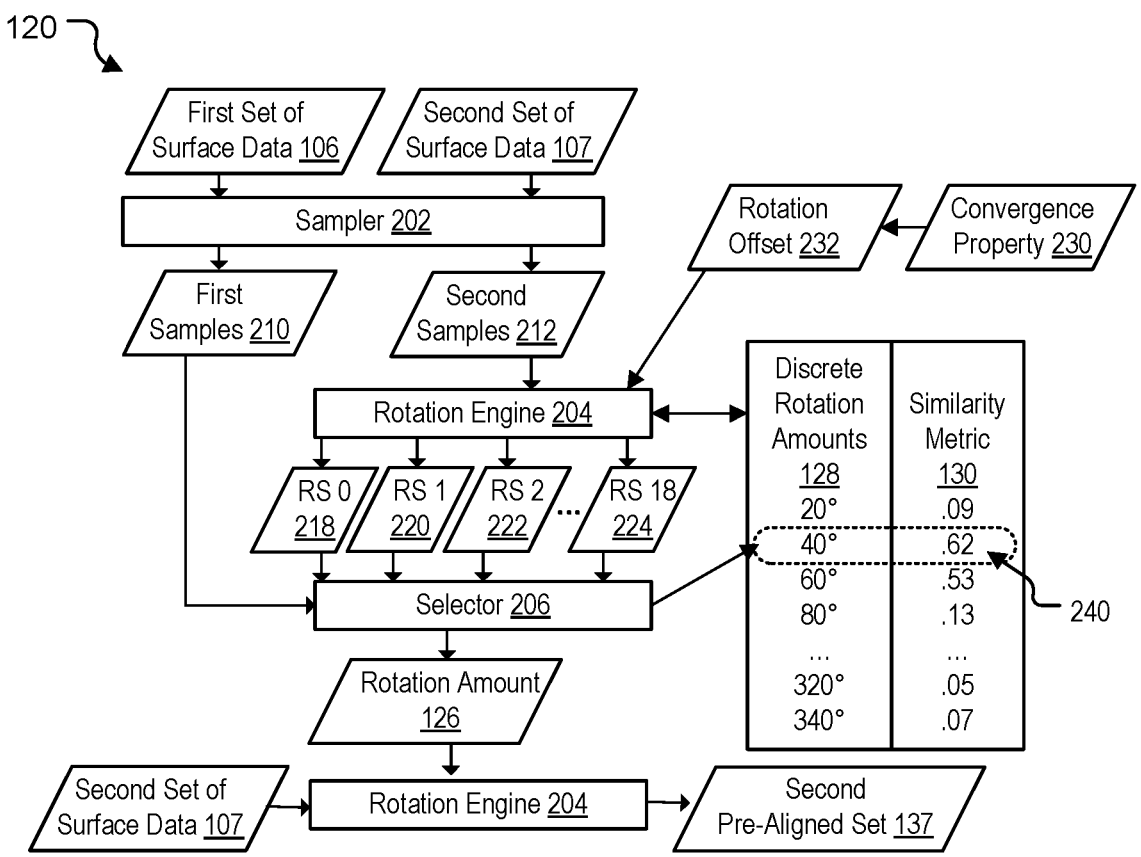
FIG. 2 is a block diagram of a particular implementation of components of the data set pre-aligner of FIG. 1.

FIG. 2 depicts an illustrative implementation of the data set pre-aligner 120 that includes a sampler 202, a rotation engine 204, and a selector 206. The sampler 202 is configured to receive multiple sets of surface data and to generate samples corresponding to the multiple sets. For example, as illustrated, the sampler 202 is configured to determine first samples 210 corresponding to the first set 106 and to determine second samples 212 corresponding to the second set 107. For example, the first samples 210 can include samples of the 3D points of the first set 106. Alternatively, the first samples 210 can include samples of features that are based on the 3D points of the first set 106. For example, the features may correspond to normal vector data computed based on the surface data. Similarly, the sampler 202 is configured to generate the second samples 212 that can include samples of the 3D points of the second set 107, samples of second features that are based on the 3D points of the second set 107, or combination thereof.

In some implementations, the rotation engine 204 is configured to generate the multiple discrete rotation amounts 128 by applying a rotation offset 232. As illustrated, the rotation offset 232 corresponds to a 20-degree offset. The rotation offset 232 is based on a convergence property 230 of the iterative alignment 142 of FIG. 1. In an example, the convergence property 230 corresponds to an offset distance beyond which the data set aligner 140 has reduced likelihood to converge during an alignment process or has increased likelihood of converging to a local minimum rather than to a global alignment minimum when determining a closest fit between points of two sets of surface data. In some implementations, the rotation offset 232 is determined based on theoretical or computed properties of a closest point matching process performed by the data set aligner 140. In other implementations, the rotation offset 232 may be determined empirically and may correspond to a type of object being scanned. For example, a relatively featureless object may have a relatively small rotation offset 232 as compared to an object having a relatively large number of unique features to enable accurate alignment.

The rotation engine 204 is configured to iteratively apply the multiple discrete rotation amounts 128 to the second samples 212. To illustrate, the discrete rotation amounts 128 are depicted as a set of degrees of rotation, beginning with 20 degrees, 40 degrees, 60 degrees, 80 degrees, and continuing at 20-degree increments to 340 degrees. The original orientation of the second samples 212 corresponds to 0 degrees rotation. The rotation engine 204 is configured to apply a first of the discrete rotation amounts 128 (e.g., 20 degrees) to generate a first rotated set of samples (RS 1) 220. The rotation engine 204 is configured to apply the second discrete rotation amount (e.g., 40 degrees) to the second samples 212 to generate second rotated samples (RS 2) 222. The rotation engine 204 may similarly generate multiple sets of rotated samples, one set for each of the discrete rotation amounts 128, up to and including an 18th rotated set (RS 18) 224, corresponding to a 340-degree rotation. Although the rotation engine 204 generates the rotated sets of samples RS 1 220-RS 18 224 iteratively in the implementation depicted in FIG. 2, in another implementations in which a sufficient amount of processor resources is available for parallel processing, the rotation engine 204 generates two or more of the rotated sets of samples RS 1 220-RS 18 224 at least partially in parallel, e.g., overlapping in time, resulting in increased throughput of the rotation engine 204.

A similarity metric 130 may be generated for each of the rotated sets and for the unrotated second samples 212 (e.g., RS 0 218 having a 0-degree rotation). The similarity metric 130 may indicate, for example, a measurement of how closely each of the sets of the second samples 218-224 match the first samples 210. As illustrated, the similarly metric 130 has a value between 0 and 1, with higher values indicating higher degrees of matching between sets of samples.

The selector 206 is configured to select the rotation amount that results in a highest determined similarity 240 between the first samples 210 and the rotated second samples 218-224. As illustrated, the rotated set associated with a 40-degree rotation has a similarity metric value of 0.62, which is the highest value of the similarity metric among the multiple values of the similarity metric that are computed for the discrete rotation amounts. The selector 206 therefore selects 40 degrees as the rotation amount 126.

The selected rotation amount 126 is provided to the rotation engine 204. The rotation engine 204 is configured to apply a rotation operation with respect to the second set of surface data 107 to rotate by the rotation amount 126 to generate the second pre-aligned set 137.

Using the samples 210, 212 to perform pre-alignment as opposed to using the full sets of surface data 106, 107 enables selection of a rotation amount using a reduced set size, enabling accurate results with significantly reduced processing power and resource consumption.

Although the rotation engine 204 is described as generating the similarity metric 130 for each of the rotated sets of samples 218-224, and other implementations the selector 206 generates the similarity metric 130 or another component generates the similarity metric 130. Although the similarly metric 130 is illustrated as having a value of between 0 and 1, with a higher value indicating a greater similarity, in other implementations the similarity metric 130 may correspond to a difference metric, such as a Euclidean distance between features in the sets of samples, and a lower value corresponds to a higher similarity between the first samples 210 and the rotated second samples 218-224.

Although FIG. 2 illustrates the discrete rotation amounts 128 and the pre-alignment as corresponding to rotation in a single angular dimension, in other implementations the pre-aligner 120 is configured to also perform rotations in one or more additional angular dimensions, such as rotations about each of the three orthogonal coordinate axes X, Y, Z in a rectangular coordinate system. An example of multi-dimensional pre-alignment selection is described further with reference to FIG. 9.

Figure 3:
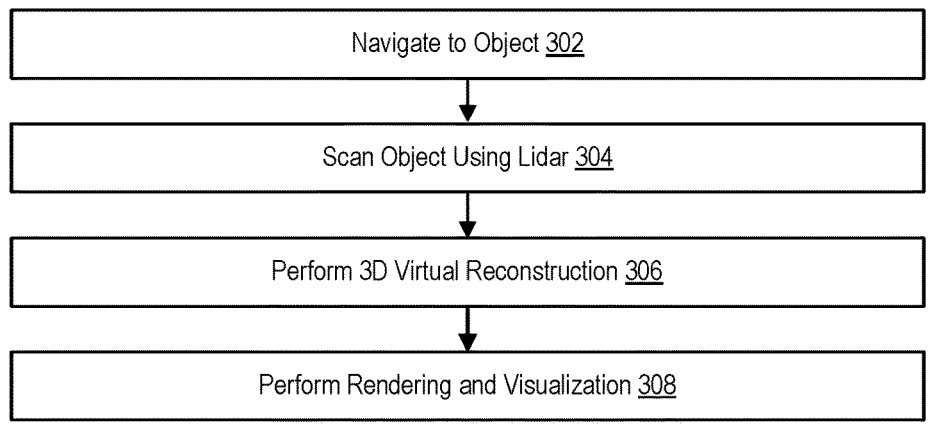
FIG. 3 is a diagram that illustrates a flow chart of an example of method of interacting with a natural object that may be performed by the system of FIG. 1.

FIG. 3 depicts an example of a method 300 that may be performed by the system 100 of FIG. 1. The method 300 includes navigating to an object, at 302, such as a natural object or spacecraft. For example, the spacecraft 194 may be controlled to navigate to the object 160, such as a comet or asteroid.

The method 300 includes, at 304, scanning the object, such as using the lidar system 192. Scanning the object results in the generation of multiple sets of surface data, such as the multiple sets 106-108.

The method 300 includes, at 306, performing 3D virtual reconstruction of the object 160 based on the multiple overlapping sets of surface data 106-108. For example, the 3D virtual reconstruction can be performed by the apparatus 101 within a component of the spacecraft 194.

The method 300 includes, at 308, performing rendering and visualization. In an example, the 3D model 152 generated as a result of the 3D virtual reconstruction at 306 is rendered and displayed at a user interface to enable visual mapping and selection by a user, such as a pilot of the spacecraft 194. The 3D model 152 may be used along with rendering and visualization to enable operations to be performed by the spacecraft 194 with respect to the object 160.

In an illustrative example, a spacecraft navigates to the target object (e.g., the object 160) and then uses on-board sensors, such as the lidar system 192, to scan the target from various circular or planar orbital locations. A component of the spacecraft 194, such as an on-board computer that incorporates the data set pre-aligner 120, the data set aligner 140, and the 3D model generator 150, executes the 3D virtual reconstruction operations. After the 3D virtual reconstruction operations are performed, a surface is rendered and visualized on a user interface.

Figure 4:
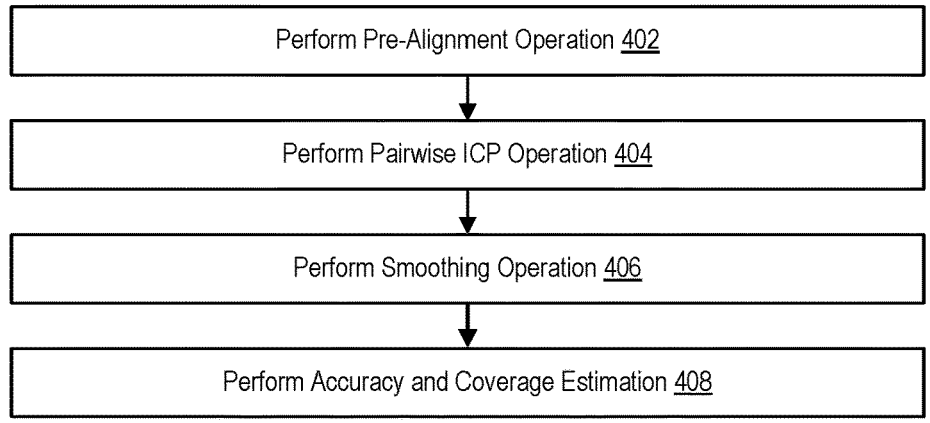
FIG. 4 is a diagram that illustrates a flow chart of an example of a method of performing 3D virtual reconstruction that may be performed by the system of FIG. 1.

FIG. 4 depicts an example of a method 400 of 3D virtual reconstruction. For example, the method 400 may be implemented while performing the 3D virtual reconstruction at 306 of FIG. 3. In some implementations, the method 400 is performed by the apparatus 101 of FIG. 1.

The method 400 includes, at 402, performing a pre-alignment operation. In an example, the pre-alignment operation corresponds to the pre-alignment 122 and is performed by the data set pre-aligner 120 of FIG. 1.

The method 400 includes, at 404, performing pairwise ICP operation. Any of various pairwise ICP techniques can be used to stitch all 3D images together to generate a surface model, such as described with reference to FIG. 6. The pairwise ICP operation can include determining, based on two sets of points, a transformation that results in a reduced distance measurement between corresponding points of the two sets of points.

The method 400 includes, at 406, performing a smoothing operation. The smoothing operation includes locating corresponding points between two sets that have be aligned relative to each other by the ICP operation. The smoothing operation reduces an amount of noise in a resulting set that combines the two aligned sets, such as by performing a weighted average of corresponding points to generate a single point in place of each pair of corresponding points. An example of the smoothing operation is described in further detail with reference to FIG. 7.

The method 400 includes, at 408, performing accuracy and coverage estimation. For example, a determination may be made as to an accuracy of a resulting data set indicative of the 3D model of the object. In addition, an estimate may be made regarding an amount of coverage resulting from the multiple sets of surface data. In an example, accuracy and coverage estimation is determined based on comparisons to one or more test scan objects or ground truth data. In another example, accuracy and coverage estimation is determined based on one or more statistical or empirical processes regarding relative speed of the spacecraft 194 to the object 160, distance between the spacecraft 194 and the object 160, resolution and noise associated with the sensors of the lidar system 192, one or more other factors, or any combination thereof. Although FIG. 4 includes performing the accuracy and coverage estimate 408, in other implementations accuracy and coverage estimations are omitted.

Figure 5:
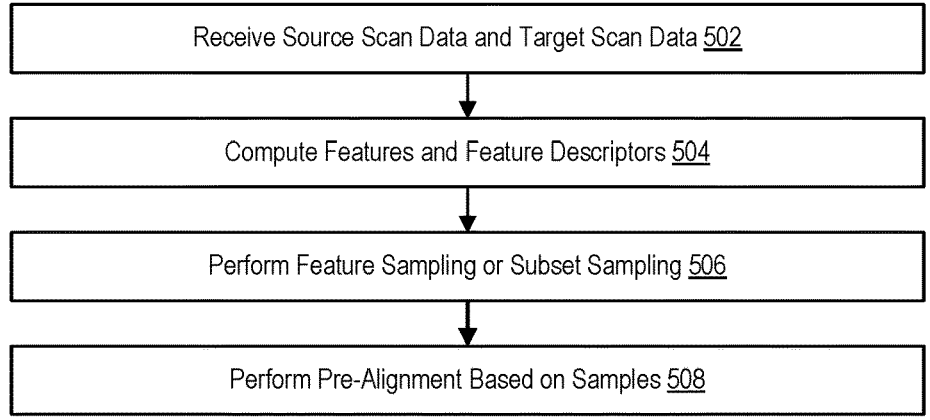
FIG. 5 is a diagram that illustrates a flow chart of an example of a method of performing data pre-alignment that may be performed by the system of FIG. 1.

Conventionally, becoming trapped in local minima is one of the problems that can occur in an ICP operation. To avoid local minima during registration, a fast pre-alignment operation can be applied as shown in FIG. 5 in which 3D features and their descriptors are computed, such as normals, curvatures, and point feature histograms. Features of the scans or portions of the scans are then selected using subset sampling. Pre-alignment can be performed using any of a variety of techniques, such as holography computation and random sample consensus (RANSAC)-based methods. In the particular implementation illustrated in FIGS. 1-2, a fast brute-force pre-alignment is used for source and target alignment. FIG. 5 depicts a particular example of a method 500 of surface data set pre-alignment. In some implementations, the method 500 is performed as part of performing the pre-alignment operation, at 402 of FIG. 4.

The method 500 includes, at 502, receiving source scan data and target scan data. In an example, the source scan data corresponds to the first set of surface data 106 and target scan data corresponds to the second set of surface data 107.

The method 500 includes, at 504, computing features and feature descriptors. For example, the sampler 202 of FIG. 2 can be configured to compute features, e.g. normal vectors, edges, one or more other features, or any combination thereof, and to generate descriptors of such computed features.

The method 500 includes, at 506, performing feature sampling or subset sampling of the computed features and feature descriptors. For example, the sampler 202 is configured to perform sampling of the features, or sampling of the surface data itself, to generate the first samples 210 and the second samples 212 of FIG. 2.

The method 500 includes, at 508, performing pre-alignment based on the samples. For example, the rotation engine 204 and the selector 206 interact to apply the multiple discrete rotation amounts 128 to one of the set of samples and to determine which of the rotated sets of samples 218-224 has the highest similarity 240 with respect to the first samples 210.

Table 1 illustrates an example of pseudocode pre-alignment operations that takes as input the point-cloud scans or samples $S_i$, $S_j$ (e.g., samples 210-212 of FIG. 2) and $X_{res}$, $Y_{res}$, and $Z_{res}$ (the angular-rotation resolutions with respect to the X, Y, and Z axes, respectively) and tries to find the alignment AX, AY, and AZ (angular rotations with respect to the X, Y, and Z axes, respectively) with highest computed similarity by selecting the lowest computed distance metric $D_{min}$. The source scan can be rotated with respect to the target scan in all directions, and the rotation giving the best similarity between scans is determined. $X_{res}$, $Y_{res}$, and $Z_{res}$ are set to a pre-computed resolution value or "breaking point" such as 20-30 degrees. In another example, a breaking-point estimate using ICP is computed. The breaking point can be defined as the amount of noise in sensor pose at which ICP starts to fail to produce a valid alignment. A breaking point estimate can be generated using ICP on pre-specified training or test models of natural objects. In another example, the breaking point is chosen to obtain desired speed and accuracy values.

input scans are downsampled. A main ICP class object is set with parameters. For each scan, the transformation between pairwise scans labeled as target and source is determined. All scans that sequentially follow the target and source scan are also updated with new computed transformation.

TABLE 2

1. Input = {$S_1$, $S_2$, $S_3$, . . . $S_N$}
2. Set ICP Parameters
3. for ( i = 2; i <= N; i++){
    j = i − 1
    $T_{ij}$ = ICP($S_j$, $S_i$)
    for (k = i; k < N; k++){
       Transform($S_k$, $T_{ij}$)
    }
  }

Figure 7:
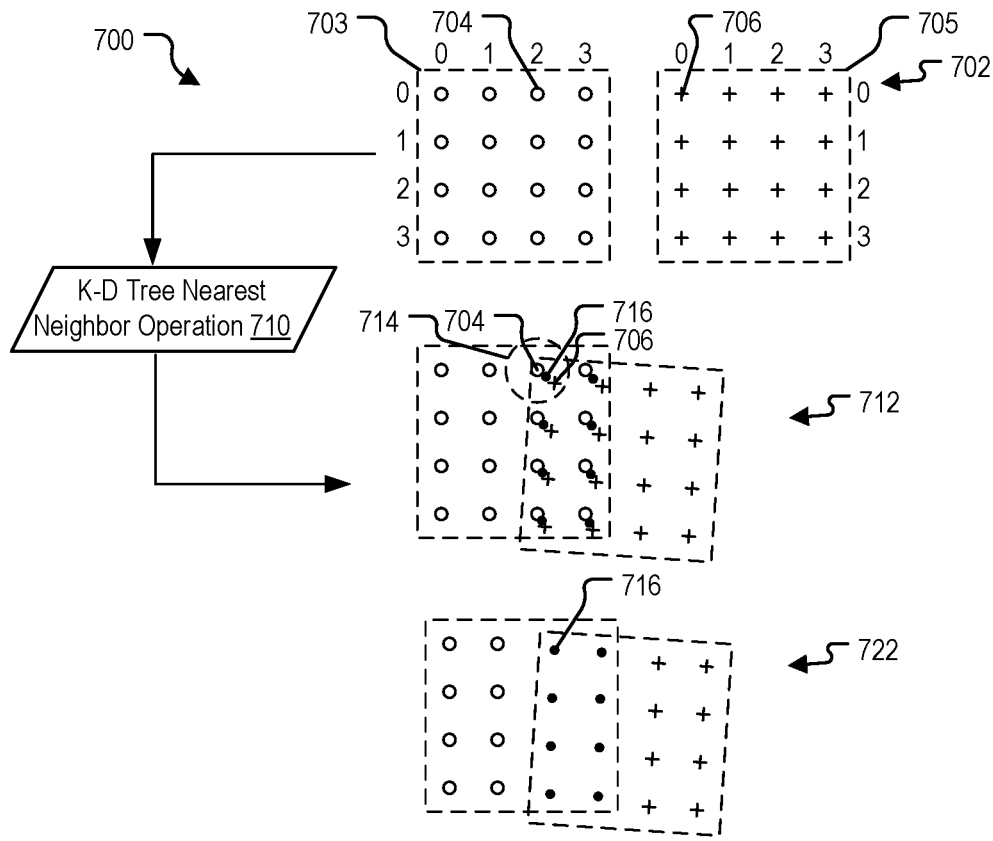
FIG. 7 is a diagram that illustrates an example of a smoothing operation that may be performed by the system of FIG. 1.

Referring to FIG. 7, an illustrated example of data combining and smoothing is depicted. In an example, the data combining and smoothing operation 700 is performed by the 3D model generator 150 of FIG. 1.

For illustration, a pair of point clouds 702 includes a simplified first point cloud 703 that graphically depicts 3D points in the first set of surface data and a simplified second point cloud 705 that graphically depicts 3D points in the

TABLE 1

1. Input = {$S_i$, $S_j$, $X_{res}$, $Y_{res}$, $Z_{res}$}
2. Initially align (e.g., translate) both scans based on center of mass of each scan
   Set minimum similarity $D_{min}$ = infinity (or very large number)
   AX = 0, AY = 0, AZ = 0
3. Perform 3D, brute force rotations and similarity measurements
   for { rx = 0; rx < 360; rx = rx + $X_{res}$){
      for { ry = 0; ry < 360; ry = ry + $Y_{res}$){
         for { rz = 0; rz < 360; rz = rz + $Z_{res}$){
            $S_{tmp}$ = Transform(Sj, rx, ry, rz)
            d = Sim($S_i$, $S_{tmp}$) //determine distance metric for set i and rotated set j
            if(d < $D_{min}$){
               $D_{min}$ = d
               AX = rx, AY = ry, AZ = rz
            }
         }
      }
   }
4. Output = {AX, AY, AZ}

Figure 6:
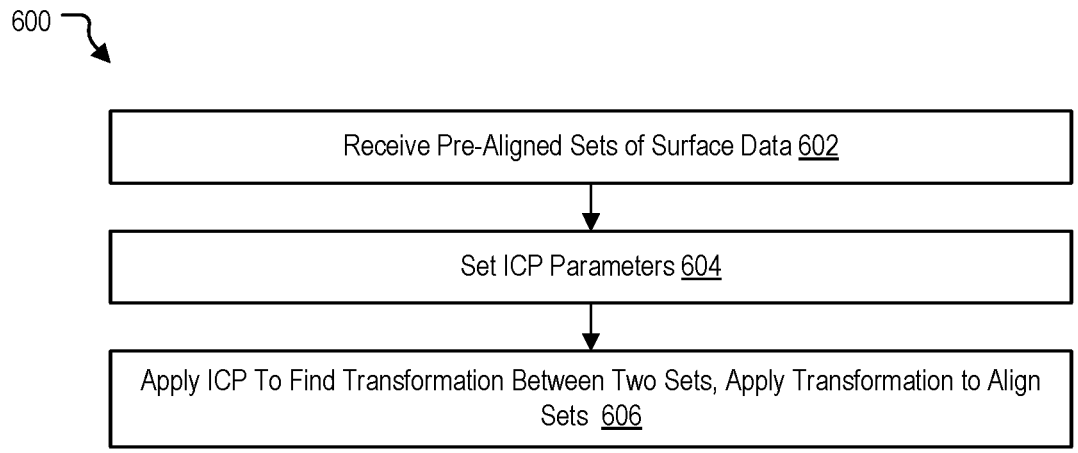
FIG. 6 is a diagram that illustrates a flow chart of an example of a method of performing data alignment that may be performed by the system of FIG. 1.

Referring to FIG. 6, a particular example of a method 600 of performing a pairwise ICP operation is illustrated. In some implementations, the method 600 is performed while performing the pairwise ICP operation at 404 of FIG. 4.

The method 600 includes, at 602, receiving pre-aligned sets of surface data. For example, the data set aligner 140 receives the first pre-aligned set 136 and the second pre-aligned set 137 from the data set pre-aligner 120.

The method 600 includes, at 604, setting ICP parameters and, at 606, applying an ICP process to find a transformation between two sets and applying the transformation to align the sets. In an example, the data set aligner 140 is configured to perform an ICP process to a pair of pre-aligned surface data sets and to generate, as a result of the ICP process, a transformation (e.g., one or more sets of matrices indicating translation, rotation, or a combination thereof). The data set aligner 140 is configured to apply the transformation to one of the pre-aligned sets to generate a pair of aligned sets.

In a particular implementation, pseudocode operations associated with the ICP operation described in FIG. 6 are depicted in Table 2 and include storing input scans in memory in order, such as S1, S2, S3, . . . SN. Optionally, the second set of surface data. The first point cloud 703 illustrates points arranged in an array having four rows labeled 0-3 and four columns labeled 0-3. A representative first point 704 may correspond to the selected point in the first set. The points in the second point cloud 705 are also arranged in an array having four rows labeled 0-3 and four columns labeled 0-3. A representative second point 706 corresponds to the selected point in the second point cloud 705.

The first point cloud 703 and the second point cloud 705 overlap such that, when properly aligned, the first point 704 and the second point 706 are in the same position. That is, the first point 704 and the second point 706 are a pair of closest corresponding points. However, the second point cloud 705 is misaligned with respect to the first point cloud 703, as illustrated in an overlapping point cloud 712. As depicted in the overlapping point cloud 712, the second point cloud 705 is shifted down relative to the first point cloud 703 and is rotated relative to the first point cloud 703. As result, corresponding points in the overlapping portion between the first point cloud 703 and the second point cloud 705 are not perfectly aligned with each other.

In a particular implementation, the 3D model generator 150 of FIG. 1 is configured to locate, for each point (e.g., the first point 704) in a first set of the multiple sets of surface data, the closest point (e.g., the second point 706) that is within a threshold distance 714 (represented by a radius of a circle centered at the first point 704) of that point in another set of the multiple sets of surface data. For example, the 3D model generator 150 is configured to locate, for the first point 704, that the second point 706 is the closest point within the threshold distance 714, such as based on a k-dimensional (k-d) tree nearest neighbor operation 710.

The 3D model generator 150 is further configured to generate a combined point 716 based on a combination of the first point 704 and the closest point 706. For example, the 3D model generator 150 is configured to determine a weighted average of the point 704 and the closest point 706 (e.g., a weighted average of coordinate positions of the two points 704, 706). The weighted average is used as the combined point 716, and the first point 704 and the second point 706 are discarded from the combined data 722.

Although FIG. 7 depicts an illustrative example of a combining operation, other implementations of a combining operation may deviate from the illustrative example. For example, the k-d tree nearest neighbor operation 710 may be omitted or another search enhancement technique may be used instead. As another example, points that are within the threshold distance to a first point may be identified before, or concurrently with, identifying which of the points is closest to the first point.

Table 3 illustrates an example of pseudo code that may be implemented by the 3D model generator 150 to perform smoothing and combining operations of multiple sets, and Table 4 illustrates an example of pseudo code that may be used to perform a particular smoothing operation between two sets. As illustrated in Table 4, a weighted combination of points and overlapping sets is used to combine and smooth the resulting combined set.

TABLE 3

```
SMOOTH_INIT(Cloud, Delta){
    Source = LOAD(Cloud[0])
    for(i=1; i<Cloud.Size( ); i++){
        Target = LOAD(Cloud[i])
        Source = SMOOTH(Source, Target, Delta)
    }
    SAVE(Source)
}
```

In Table 3, Cloud is an input array of point clouds. In an example, Cloud[0] corresponds to the first set of surface data 106, Cloud[1] corresponds to the second set of surface data 107, etc. Delta is an input that indicates a distance threshold used for identifying common points in adjacent point clouds. The pseudocode of Table 4 sequentially processes the point clouds, smoothing and combining each point cloud into the Source data structure, and then proceeding to the next point cloud. The pseudocode of Table 3 calls a function SMOOTH, which is described in Table 4.

Inputs to the smoothing operation are 3D scans and smoothing parameters such as the smoothing distance Delta. The smoothing distance can be set according to sensor noise and an average distance between scans. The smoothing operation can be applied for all scans using the SMOOTH (Si, Sj, Delta) function, which is described in Table 4 and includes, for each 3D point in source and target, initialize its weight to 1; for each point in the target, find the nearest neighbor in the source with a given Delta and average the target point p with the source point q; and return the updated smooth source and target scans or the combined average scan.

TABLE 4

```
SMOOTH (Source, Target, Delta){
    Result = new Cloud( )
    Initialize p.w = 1, q.w = 1 //initialize weights for points
    foreach(Point p in Source){
// use k-d process to locate, in Target, the closest point q to point p, and to determine
// the distance d between p and q
        (q,d) = KD_TREE_NN(p, Source, Target)
        If(d < Delta){
            p = (p.w*p + q.w*q)/(p.w + q.w) // set p to weighted average of p and q
            REMOVE(q, Target)
            p.w = p.w + 1
        }
        ADD(Result, p)
    }
    foreach (Point q in Target){
        ADD(Result, q)
    }
    RETURN Result
}
```

Figure 8:
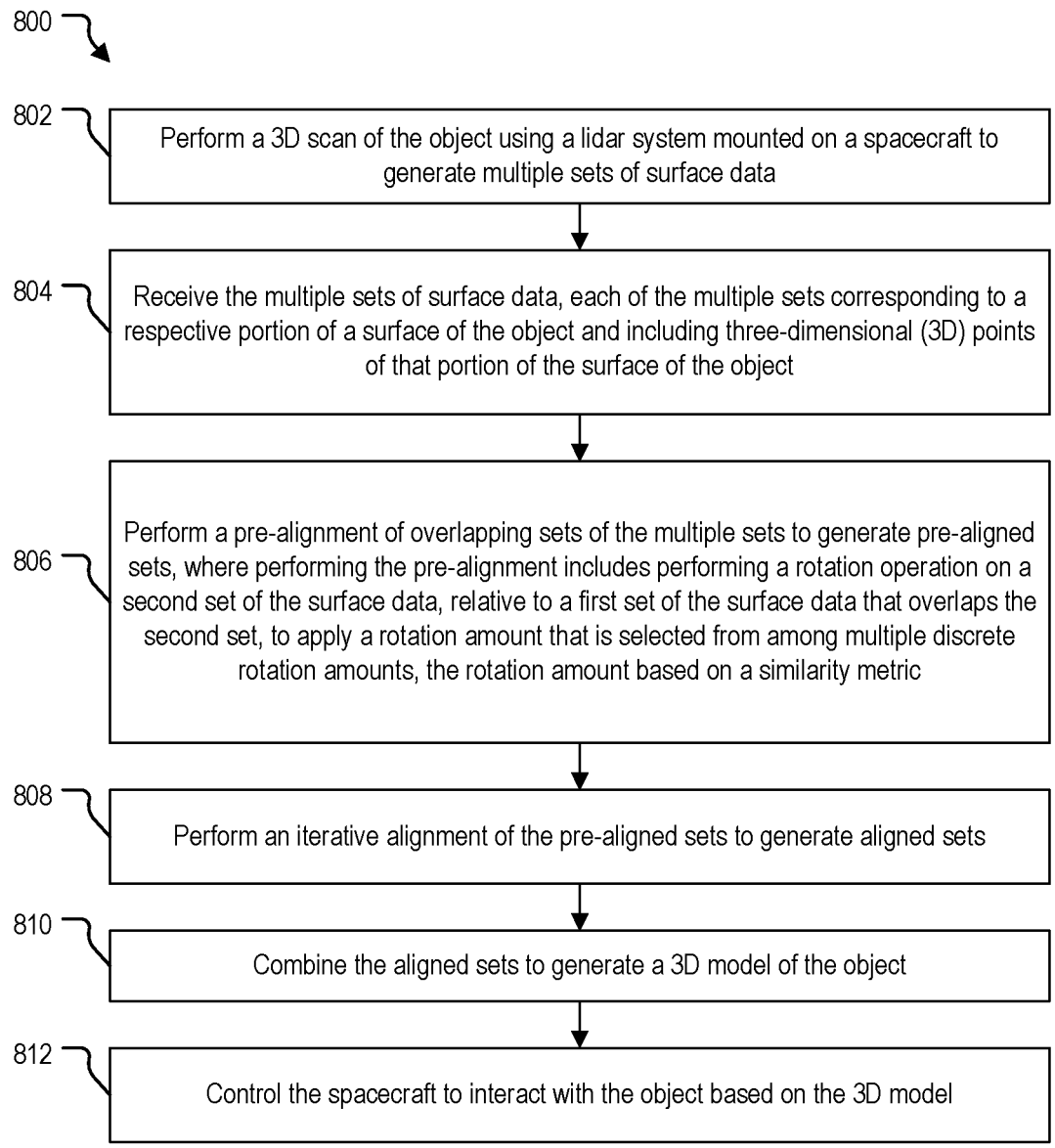
FIG. 8 is a diagram that illustrates a flow chart of an example of a method of generating a model of a surface of an object that may be performed by the system of FIG. 1.

FIG. 8 is a diagram that illustrates a flow chart of an example of a method 800 of generating a model of a surface of an object. In an illustrative implementation, the method 800 is performed by the apparatus 101 of FIG. 1.

The method 800 includes, at 802, performing a 3D scan of the object using a lidar system mounted on a spacecraft to generate multiple sets of surface data. In an example, the lidar system 192 of FIG. 1 scans the object 160 to generate the multiple sets of surface data 106-108. Scanning the object to generate the multiple sets of surface data enables the spacecraft to perform on-board operations to generate a 3D model of the object without delays and power consumption associated with wireless transmission of the multiple sets of surface data to or from a remote system. However, in other implementations the method 802 does not include performing a 3D scan of the object using a lidar system mounted on a spacecraft. In an example, a 3D scan is performed using a 3D camera system or other 3D sensors without using lidar. In another example, the multiple sets of surface data are received, such as via wireless transmission from a scanning system that is remote from the spacecraft. In another example, the method 800 is performed on an aircraft, watercraft, or other vehicular system, or at a non-vehicular system (e.g., at a conventional computer system) rather than at a spacecraft.

The method 800 includes, at 804, receiving the multiple sets of surface data. Each of the multiple sets corresponds to a respective portion of a surface of an object and includes three-dimensional (3D) points of that portion of the surface of the object, such as the multiple sets 106-108 of FIG. 1 that correspond to the portions 162-164, respectively, of the surface of the object 160. In an illustrative example, the object includes an astronomical object or a spacecraft.

The method 800 includes, at 806, performing a pre-alignment of overlapping sets of the multiple sets to generate pre-aligned sets. In an example, the pre-alignment is performed by the data set pre-aligner 120 of FIG. 1. Performing the pre-alignment includes performing a rotation operation on a second set of the surface data, relative to a first set of the surface data that overlaps the second set, to apply a rotation amount that is selected from among multiple discrete rotation amounts. The rotation amount is selected based on a similarity metric. In a particular implementation, the rotation engine 204 of FIG. 2 applies the discrete rotation amounts 128 to the second samples 212, and the selector 206 selects the rotation amount 126 corresponding to the highest determined similarity 240 (e.g., a largest of the values of the similarity metric 130 corresponding to the discrete rotation amounts 128). In some implementations, the pre-alignment is performed as described with reference to FIG. 5.

The method 800 includes, at 808, performing an iterative alignment of the pre-aligned sets to generate aligned sets. In an example, the iterative alignment is performed by the data set aligner 140 of FIG. 1. In some implementations, the iterative alignment includes an ICP operation performed as described with reference to FIG. 6.

The method 800 includes, at 810, combining the aligned sets to generate a 3D model of the object. In an example, combining of the aligned sets is performed by the 3D model generator 150 of FIG. 1 to generate the 3D model 152. In some implementations, combining of the aligned sets is performed as described with reference to FIG. 7.

The method 800 includes, at 812, controlling the spacecraft to interact with the object based on the 3D model. In an example, a flight computer on the spacecraft 194 executes instructions to initiate movement the spacecraft 194 to a particular position, pose, or orbit relative to the object 160, to apply one or more other scans or interactions with the object 160, or to land upon the object 160, as illustrative, non-limiting examples. In other implementations in which the method 800 is not performed at a spacecraft or in which the spacecraft does not interact with the object based on the 3D model, the method 800 omits controlling the spacecraft to interact with the object based on the 3D model.

By pre-aligning the sets of surface data based on selecting a rotation amount from multiple discrete rotation amounts, a number of iterations of the iterative alignment can be reduced and a likelihood of convergence of the iterative alignment without becoming trapped in a local minimum is improved as compared to performing the iterative alignment of the surface data without pre-alignment. Thus, the spacecraft 194 can efficiently generate the 3D model of the object, even using constrained resources associated with space hardware, and can use the 3D model to guide additional interactions with the object, reducing delay and resources associated with transfer of data, flight control instructions, or other information to and from an off-board system (e.g., a control station on Earth).

Figure 9:
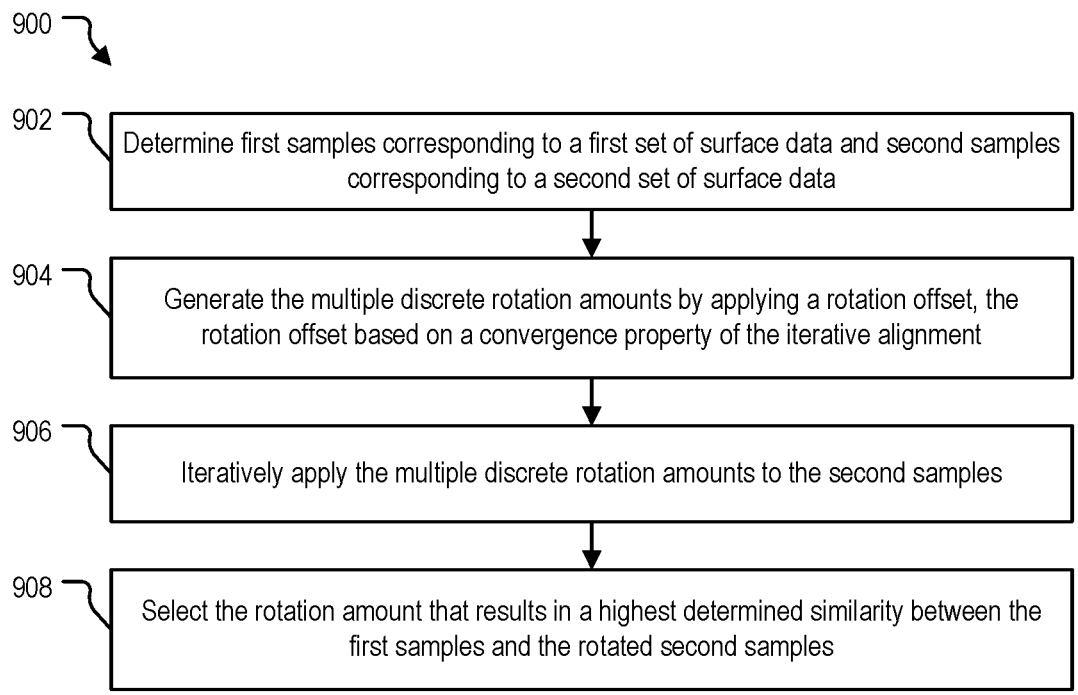
FIG. 9 is a diagram that illustrates a flow chart of an example of a method of performing data pre-alignment that may be included in the method of FIG. 8.

FIG. 9 is a diagram that illustrates a flow chart of an example of a method 900 of performing data pre-alignment. In a particular implementation, the method 900 is performed during performance of the pre-alignment, at 806 of FIG. 8.

The method 900 includes, at 902, determining first samples corresponding to the first set and second samples corresponding to the second set. In a particular implementation, the first samples include samples of the 3D points of the first set or samples of first features that are based on the 3D points of the first set, and the second samples include samples of the 3D points of the second set or samples of second features that are based on the 3D points of the second set. In an example, the sampler 202 of FIG. 2 processes the first set of surface data 106 to generate the first samples 210 and processes the second set of surface data 107 to generate the second samples 212.

The method 900 includes, at 904, generating multiple discrete rotation amounts by applying a rotation offset, and the rotation offset is based on a convergence property of an iterative alignment. In an example, the rotation engine 204 of FIG. 2 generates the discrete rotation amounts 128 based on multiples of the rotation offset 232, and the rotation offset 232 is selected so that a rotational misalignment of the resulting pre-aligned sets is small enough to satisfy the convergence property 230 associated with an ICP alignment process. However, in other implementations the discrete rotation amounts are generated via another mechanism or are retrieved from storage without be generated by the rotation engine 204.

The method 900 includes, at 906, iteratively applying the multiple discrete rotation amounts to the second samples. In an example, the rotation engine 204 applies the discrete rotation amounts 128 to the second samples 212 to generate the multiple sets of rotated samples 218-224.

The method 900 includes, at 908, selecting the rotation amount that results in a highest determined similarity between the first samples and the rotated second samples. In an example, the selector 206 of FIG. 2 identifies a largest (or smallest) value of the similarity metric 130 corresponding to the highest determined similarity 240 and selects the corresponding rotation amount 126.

Selecting a rotation amount from among multiple discrete rotation amounts enables pre-alignment of sets of surface data with relatively low computational complexity and providing sufficient angular resolution to satisfy a convergence property of an alignment operation. As a result, the alignment operation can be performed using reduced processing resources, in reduced iterations, and having greater resilience to local minima traps as compared to performing the alignment operation on data that has not been pre-aligned. Computational costs associated with the pre-alignment are further reduced by selection of samples or sub-sets of the surface data as compared to performing pre-alignment on a full set of surface data or feature data.

Figure 10:
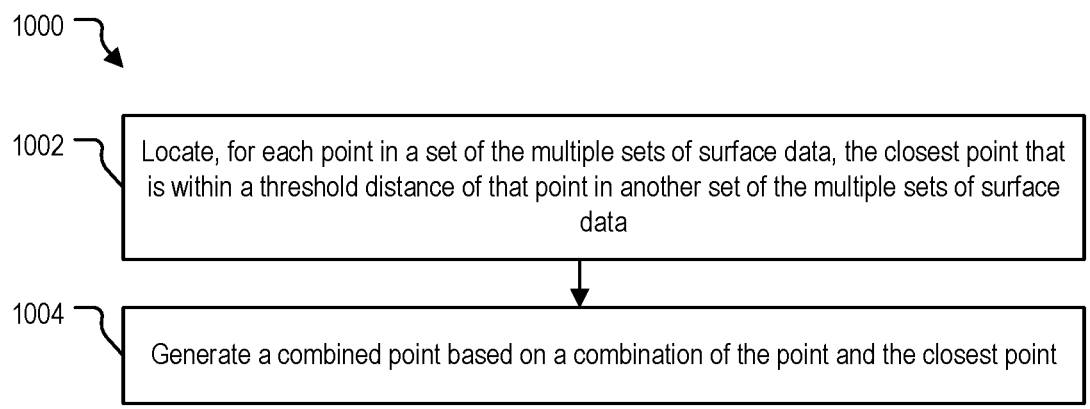
FIG. 10 is a diagram that illustrates a flow chart of an example of a method of combining aligned sets of surface data that may be included in the method of FIG. 8.

FIG. 10 is a diagram that illustrates a flow chart of an example of a method of combining aligned sets of surface data. In a particular implementation, the method 1000 is performed during combining the aligned sets, at 810 of FIG. 8. In an illustrative example, the method 1000 is performed by the 3D model generator 150 of FIG. 1.

The method 1000 includes, at 1002, locating, for each point in a set of the multiple sets of surface data, the closest point that is within a threshold distance of that point in another set of the multiple sets of surface data. In an example, the closest point is located based on a k-dimensional (k-d) tree nearest neighbor operation, such as the k-d tree nearest neighbor operation 710 of FIG. 7.

The method 1000 includes, at 1004, generating a combined point, such as the combined point 716 of FIG. 7, based on a combination of the point and the closest point. In a particular implementation, generating the combined point includes determining a weighted average of the point and the closest point. In an example, a weighted average is determined in accordance with the pseudo-code of Table 4.

By generating combined points based on a combination of the closest neighboring points of overlapping sets of surface data, 'noisiness' of the combined data is reduced as compared to including both of the closest neighboring points in the combined surface data.

Figure 11:
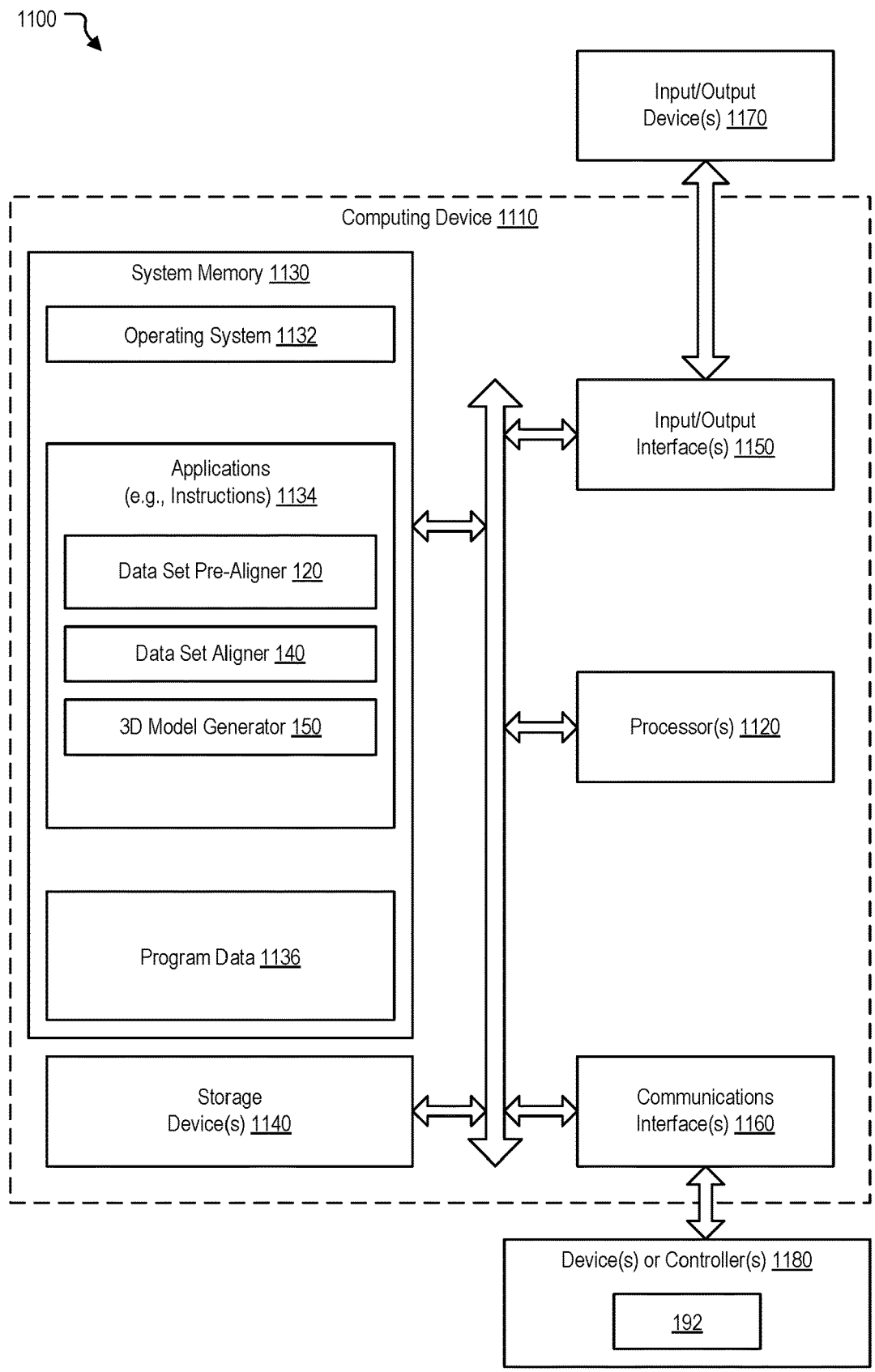
FIG. 11 is a block diagram of a computing environment including a computing device configured to support aspects of computer-implemented methods and computer-executable program instructions (or code) according to the present disclosure.

FIG. 11 is a block diagram of a computing environment 1100 including a computing device 1110 configured to support aspects of computer-implemented methods and computer-executable program instructions (or code) according to the present disclosure. For example, the computing device 1110, or portions thereof, is configured to execute instructions to initiate, perform, or control one or more operations described with reference to FIGS. 1-10.

The computing device 1110 includes one or more processors 1120. The processor(s) 1120 are configured to communicate with system memory 1130, one or more storage devices 1140, one or more input/output interfaces 1150, one or more communications interfaces 1160, or any combination thereof. The system memory 1130 includes volatile memory devices (e.g., random access memory (RAM) devices), nonvolatile memory devices (e.g., read-only memory (ROM) devices, programmable read-only memory, and flash memory), or both. The system memory 1130 stores an operating system 1132, which may include a basic input/output system for booting the computing device 1110 as well as a full operating system to enable the computing device 1110 to interact with users, other programs, and other devices. The system memory 1130 stores system (program) data 1136, such as the first set of surface data 106, the second set of surface data 107, the third set of surface data 108, the pre-aligned sets 136-138, the aligned sets 146-148, the multiple discrete rotation amounts 128, the 3D model 152, other data, or a combination thereof.

The system memory 1130 includes one or more applications 1134 (e.g., sets of instructions) executable by the processor(s) 1120. As an example, the one or more applications 1134 include instructions executable by the processor(s) 1120 to initiate, control, or perform one or more operations described with reference to FIGS. 1-10. To illustrate, the one or more applications 1134 include instructions executable by the processor(s) 1120 to initiate, control, or perform one or more operations described with reference to the data set pre-aligner 120, the data set aligner 140, the 3D model generator 150, or a combination thereof.

In a particular implementation, the system memory 1130 includes a non-transitory, computer readable medium storing the instructions that, when executed by the processor 1120, cause the processor 1120 to initiate, perform, or control operations including receiving multiple sets of surface data, each of the multiple sets corresponding to a respective portion of a surface of an object and including three-dimensional (3D) points of that portion of the surface of the object. The operations include performing a pre-alignment of overlapping sets of the multiple sets to generate pre-aligned sets, where performing the pre-alignment includes performing a rotation operation on a second set of the surface data, relative to a first set of the surface data that overlaps the second set, to apply a rotation amount that is selected from among multiple discrete rotation amounts based on a similarity metric. The operations include performing an iterative alignment of the pre-aligned sets to generate aligned sets and also include combining the aligned sets to generate a 3D model of the object.

The one or more storage devices 1140 include nonvolatile storage devices, such as magnetic disks, optical disks, or flash memory devices. In a particular example, the storage devices 1140 include both removable and non-removable memory devices. The storage devices 1140 are configured to store an operating system, images of operating systems, applications (e.g., one or more of the applications 1134), and program data (e.g., the program data 1136). In a particular aspect, the system memory 1130, the storage devices 1140, or both, include tangible computer-readable media. In a particular aspect, one or more of the storage devices 1140 are external to the computing device 1110.

The one or more input/output interfaces 1150 that enable the computing device 1110 to communicate with one or more input/output devices 1170 to facilitate user interaction. For example, the one or more input/output interfaces 1150 can include a display interface, an input interface, or both. The processor(s) 1120 are configured to communicate with devices or controllers 1180 via the one or more communications interfaces 1160. For example, the one or more communications interfaces 1160 can include a network interface. The devices or controllers 1180 can include, for example, the first 3D sensor 102, the second 3D sensor 103, the third 3D sensor 104, the lidar system 192, one or more other devices, or any combination thereof.

In conjunction with the described systems and methods, an apparatus for generating a model of a surface of an object is disclosed that includes means for receiving multiple sets of surface data and for performing a pre-alignment of overlapping sets of the multiple sets to generate pre-aligned sets, such as the data set pre-aligner 120. Each of the multiple sets correspond to a respective portion of a surface of an object and include 3D points of that portion of the surface of the object. Performing the pre-alignment includes performing a rotation operation on a second set of the surface data, relative to a first set of the surface data that overlaps the second set, to apply a rotation amount that is selected from among multiple discrete rotation amounts based on a similarity metric.

The apparatus includes means for performing an iterative alignment of the pre-aligned sets to generate aligned sets, such as the data set aligner 140. The apparatus also includes means for combining the aligned sets to generate a 3D model of the object, such as the 3D model generator 150.

In some implementations, a non-transitory, computer readable medium stores instructions that, when executed by a processor, cause the processor to initiate, perform, or control operations to perform part or all of the functionality described above. For example, the instructions may be executable to implement one or more of the operations or methods of FIGS. 3-10. In some implementations, part or all of one or more of the operations or methods of FIGS. 3-10 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus to generate a model of a surface of an object from surface image data of the object received from a plurality of cameras, the apparatus comprising:
   a data set pre-aligner configured to receive multiple sets of the surface image data from the plurality of cameras, wherein each of the multiple sets corresponds to surface image data from a camera of the plurality of cameras and comprises three-dimensional (3D) points of a portion of the surface of the object, wherein the data set pre-aligner is configured to perform a pre-alignment of overlapping sets of the multiple sets to generate pre-aligned sets, and wherein performance of the pre-alignment for an overlapping set of the overlapping sets that comprises a first set of the surface image data and a second set of the surface image data comprises:
      selection of first samples based on the first set of the surface image data, wherein the first samples comprise samples of the 3D points of the first set or samples of first features that are determined from the 3D points of the first set;
      selection of second samples based on the second set of the surface image data, wherein the second samples comprise samples of the 3D points of the second set or samples of second features that are determined from the 3D points of the second set;
      determination of a rotation amount based on similarity metrics for a plurality of discrete rotation amounts of the second samples relative to the first samples, wherein a similarity metric of the similarity metrics is determined for each discrete rotation amount relative to the first samples, and wherein the data set pre-aligner comprises a selector to select a particular rotation amount of the plurality of discrete rotation amounts that results in a highest determined similarity between the first samples and rotated second samples as the rotation amount; and
      rotation of the second set by the rotation amount to generate a pre-aligned set of the pre-aligned sets;
   a data set aligner configured to perform an iterative alignment of the pre-aligned sets to generate aligned sets; and
   a 3D model generator configured to combine the aligned sets to generate a 3D model of the object.

2. The apparatus of claim 1, wherein the data set pre-aligner, the data set aligner, and the 3D model generator are within a component of a spacecraft, and wherein the plurality of cameras comprise a lidar system mounted on the spacecraft and configured to perform a 3D scan of the object to generate the multiple sets.

3. The apparatus of claim 1, wherein the plurality of cameras comprises a stereo camera, a time-of-flight camera, a laser scanner, a structured light camera, or combinations thereof.

4. The apparatus of claim 1, wherein the samples of the first features that are determined from the 3D points of the first set comprise normal vector data.

5. The apparatus of claim 1, wherein a rotation engine of the data set pre-aligner is configured to generate the plurality of discrete rotation amounts by applying a rotation offset, the rotation offset based on a convergence property of the iterative alignment.

6. The apparatus of claim 1, wherein the 3D model generator is further configured to:
   locate, for each point in a set of the aligned sets, the closest point that is within a threshold distance of that point in another set of the aligned sets; and
   generate a combined point based on a combination of the point and the closest point.

7. The apparatus of claim 6, wherein the 3D model generator is further configured to determine a weighted average of the point and the closest point to generate the combined point.

8. The apparatus of claim 6, wherein the 3D model generator is further configured to locate the closest point based on a k-dimensional (k-d) tree nearest neighbor operation.

9. A method of generating a model of a surface of an object, the method comprising:
   receiving multiple sets of surface image data from a plurality of cameras, wherein each of the multiple sets corresponds to surface image data from a camera of the plurality of cameras and comprises three-dimensional (3D) points of a portion of the surface of the object;
   performing a pre-alignment of overlapping sets of the multiple sets to generate pre-aligned sets, wherein performing the pre-alignment for an overlapping set of the overlapping sets that comprises a first set of the surface image data and a second set of the surface image data comprises:
      selecting first samples based on the first set of the surface image data, wherein the first samples comprise samples of the 3D points of the first set or samples of first features that are determined from the 3D points of the first set;
      selecting second samples based on the second set of the surface image data, wherein the second samples comprise samples of the 3D points of the second set or samples of second features that are determined from the 3D points of the second set;
      determining a rotation amount based on similarity metrics for a plurality of discrete rotation amounts of the second samples relative to the first samples, wherein a similarity metric of the similarity metrics is determined for each discrete rotation amount relative to the first samples, and wherein a selector selects a particular rotation amount of the plurality of discrete rotation amounts that results in a highest determined similarity between the first samples and rotated second samples as the rotation amount; and rotating the second set by the rotation amount to generate a pre-aligned set of the pre-aligned sets;

performing an iterative alignment of the pre-aligned sets to generate aligned sets; and combining the aligned sets to generate a 3D model of the object.

10. The method of claim 9, wherein the object comprises an astronomical object or a spacecraft.

11. The method of claim 10, further comprising performing a 3D scan of the object using a lidar system mounted on a spacecraft to generate the multiple sets, wherein the plurality of cameras comprises cameras of the lidar system.

12. The method of claim 11, further comprising controlling the spacecraft to interact with the object based on the 3D model.

13. The method of claim 9, wherein the similarity metric corresponds to a Euclidean distance between features in the first samples and in the second samples.

14. The method of claim 9, wherein the samples of the second features that are determined from the 3D points of the second set comprise normal vector data.

15. The method of claim 9, further comprising generating the plurality of discrete rotation amounts by applying a rotation offset, wherein the rotation offset is based on a convergence property of the iterative alignment.

16. The method of claim 9, wherein combining the aligned sets comprises:

locating, for each point in a set of the aligned sets, the closest point that is within a threshold distance of that point in another set of the aligned sets; and generating a combined point based on a combination of the point and the closest point.

17. The method of claim 16, wherein generating the combined point comprises determining a weighted average of the point and the closest point.

18. The method of claim 16, wherein the closest point is located based on a k-dimensional (k-d) tree nearest neighbor operation.

19. A non-transitory, computer readable medium storing instructions that, when executed by a processor, cause the processor to initiate, perform, or control operations comprising:

receiving multiple sets of surface image data from a plurality of cameras, wherein each of the multiple sets corresponds to surface image data from a camera of the plurality of cameras and including three-dimensional (3D) points of a portion of a surface of an object;

performing a pre-alignment of overlapping sets of the multiple sets to generate pre-aligned sets, wherein performing the pre-alignment for an overlapping set of the overlapping sets that comprises a first set of the surface image data and a second set of the surface image data comprises:

selecting first samples based on the first set of the surface image data, wherein the first samples comprise samples of the 3D points of the first set or samples of first features that are determined from the 3D points of the first set;

selecting second samples based on the second set of the surface image data, wherein the second samples comprise samples of the 3D points of the second set or samples of second features that are determined from the 3D points of the second set;

determining a rotation amount based on similarity metrics for a plurality of discrete rotation amounts of the second samples relative to the first samples, wherein a similarity metric of the similarity metrics is determined for each discrete rotation amount relative to the first samples, and wherein a selector selects a particular rotation amount of the plurality of discrete rotation amounts that results in a highest determined similarity between the first samples and rotated second samples as the rotation amount; and rotating the second set by the rotation amount to generate a pre-aligned set of the pre-aligned sets;

performing an iterative alignment of the pre-aligned sets to generate aligned sets; and combining the aligned sets to generate a 3D model of the object.

20. The non-transitory, computer readable medium of claim 19, wherein combining the aligned sets comprises:

locating, for each point in a set of the aligned sets, the closest point that is within a threshold distance of that point in another set of the aligned sets; and generating a combined point based on a combination of the point and the closest point.

* * * * *

UNITED STATES PATENT AND TRADEMARK OFFICE
CERTIFICATE OF CORRECTION

PATENT NO. : 10,825,259 B2
APPLICATION NO. : 16/238002
DATED : November 3, 2020
INVENTOR(S) : Kyungnam Kim and Heiko Hoffmann Page 1 of 1

It is certified that error appears in the above-identified patent and that said Letters Patent is hereby corrected as shown below:

In the Claims

Column 21, Line 4, after "wherein" insert --the data set pre-aligner comprises--.

Column 21, Line 4, after "selector" insert --to select--.

Column 21, Line 5, delete "selects".

Column 22, Line 30, after "wherein" insert --the data set pre-aligner comprises--.

Column 22, Line 30, after "selector" insert --to select--.

Column 22, Line 31, delete "selects".

Signed and Sealed this
Twenty-second Day of December, 2020

Andrei Iancu
*Director of the United States Patent and Trademark Office*